United States Patent
Brown, Jr. et al.

(10) Patent No.: US 6,558,297 B1
(45) Date of Patent: May 6, 2003

(54) ENERGY STORAGE DEVICE USED IN LOCOMOTION MACHINE

(75) Inventors: H. Benjamin Brown, Jr., Pittsburgh, PA (US); Illah R. Nourbakhsh, Pgh, PA (US); Garth John Zeglin, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 14 days.

(21) Appl. No.: 09/627,605

(22) Filed: Jul. 28, 2000

(51) Int. Cl.$^7$ ................................................ A63B 26/00
(52) U.S. Cl. ............................ 482/77; 482/78; 482/112
(58) Field of Search .................................. 482/75–78

(56) References Cited

U.S. PATENT DOCUMENTS

| | | | |
|---|---|---|---|
| 224,937 A | * | 2/1880 | Mintzer ........................ 482/77 |
| 2,783,997 A | * | 3/1957 | Gaffney et al. ............... 482/77 |
| 2,793,036 A | | 5/1957 | Hansburg |
| 3,328,028 A | * | 6/1967 | Williams ..................... 482/77 |
| 3,977,094 A | | 8/1976 | Rivera et al. |
| 4,037,357 A | | 7/1977 | Monroe et al. |
| 4,282,677 A | | 8/1981 | Abe |
| 4,390,178 A | * | 6/1983 | Rudell et al. ................. 482/77 |
| 4,408,600 A | | 10/1983 | Davis |
| 4,492,374 A | | 1/1985 | Lekhtman et al. |
| 4,547,913 A | | 10/1985 | Phillips |
| 4,645,509 A | | 2/1987 | Poggi et al. |
| 4,684,111 A | | 8/1987 | Hagemeister |
| 4,702,720 A | | 10/1987 | Konta et al. |
| 4,763,885 A | | 8/1988 | Zamitter |
| 4,802,880 A | | 2/1989 | Shaw |
| 4,834,200 A | | 5/1989 | Kajita |
| 4,862,980 A | | 9/1989 | Shkolnik |
| 4,927,137 A | * | 5/1990 | Speer ......................... 482/75 |
| 4,928,977 A | | 5/1990 | Chambers |
| 4,992,072 A | | 2/1991 | Leigh |
| 5,007,938 A | | 4/1991 | Prahl |
| 5,011,136 A | | 4/1991 | Rennex |
| 5,102,119 A | * | 4/1992 | Gerlach ....................... 482/77 |
| 5,127,484 A | | 7/1992 | Bares et al. |
| 5,138,776 A | | 8/1992 | Levin |
| 5,158,493 A | | 10/1992 | Morgrey |
| 5,217,500 A | | 6/1993 | Phillips |
| 5,258,039 A | | 11/1993 | Goh et al. |
| 5,279,170 A | | 1/1994 | Chen |
| 5,326,299 A | | 7/1994 | Jasinski |
| 5,423,708 A | | 6/1995 | Allen |
| 5,455,497 A | | 10/1995 | Hirose et al. |
| 5,458,656 A | | 10/1995 | Phillips |
| 5,464,441 A | | 11/1995 | Phillips |

(List continued on next page.)

OTHER PUBLICATIONS

"Self–Stabilizing Running", Proceedings of the 1997 IEEE International Conference on Robotics and Automation, Albuquerque, New Mexico, Apr. 1997, Robert Ringrose, MIT Leg Lab, MIT Artificial Intelligence Laboratory, pp. 487–493.

"Design of a Robot Leg with Elastic Energy Storage, Comparison to Biology, and Preliminary Eprimental Results", Proceedings of the 1997 IEEE International Conference on Robotics and Automation, Albuquerque, New Mexico, Apr. 1996, Matthew D. Berkemeier and Kamal V. Desai, Dept. of Aerospace and Mechanical Engineering, Boston University, Boston, MA; pp. 213–218.

"Experiments with an Electrically Actuated Planar Hopping Robot", Intl. Symp. On Exper. Robotics III, 1993. Kvoto. Japan. P. Gregorio. M. Ahmadi and M. Beuhler. Centre for Intelligent Machines. McGill University, Department of Mechanical Engineering, Montreal, Quebec, Canada,.

*Primary Examiner*—Jerome Donnelly
(74) *Attorney, Agent, or Firm*—Kirkpatrick & Lockhart LLP (57) ABSTRACT

A locomotion device, such as a pogo stick, having a housing having a first end portion and a second end portion, a plunger being slideably connected to the housing second end portion, the leaf spring also pivotally attached to the plunger. A method for locomoting using such a device is also disclosed.

45 Claims, 7 Drawing Sheets

U.S. PATENT DOCUMENTS

| | | |
|---|---|---|
| 5,593,456 A | 1/1997 | Merlette |
| 5,593,457 A | 1/1997 | Phillips |
| 5,618,219 A | 4/1997 | Simone et al. |
| 5,645,515 A * | 7/1997 | Armstrong et al. ........... 482/75 |
| 5,653,768 A | 8/1997 | Kania |
| 5,713,819 A * | 2/1998 | Hsieh .......................... 482/77 |
| 5,725,598 A | 3/1998 | Phillips |
| 5,746,773 A | 5/1998 | Littig |
| 5,800,568 A | 9/1998 | Atkinson et al. |
| 5,827,107 A | 10/1998 | Bears et al. |

* cited by examiner

ENERGY STORAGE DEVICE USED IN LOCOMOTION MACHINE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to energy storage devices. More particularly, the present invention is directed to energy storage devices taking the form of locomotion machines using springs.

2. Description of the Background

Pogo sticks have long been enjoyed by children, but the play experience has been limited to bouncing in place, trying to locomote forward, and negotiating small obstacles. Conventional pogo sticks generally employ inefficient steel compression springs. These pogo sticks provide only a few inches of ground clearance and require the rider to exert substantial effort on every bounce to keep hopping.

Steel compression springs typically have a specific energy limited to 1200 inch-pounds/pound of mass. A steel spring of one (1) pound mass may store 1200 inch-pounds of elastic energy, and theoretically could lift its own weight. 1200 inches vertically and could lift a 150-pound load, the weight of an average person, a total height of 8 inches above the bottom most point when the steel spring is compressed. Accordingly, a two (2) pound spring would be necessary to exhibit a more desirable pogo stick lift of sixteen (16) inches, which would result in an eight (8) inch rise above the ground.

A second disadvantage of the steel compression spring used in conventional pogo sticks is its propensity to buckle laterally. That is, if the spring is held at its two ends and compressed, at some level of compression the middle of the spring will shift sideways and the spring no longer operates in its normal symmetric mode. Coil springs with an aspect ratio of greater than about 6:1 ratio exhibit buckling when substantially compressed, wherein the aspect ratio is defined as the ratio of free length to nominal coil diameter. A typical pogo stick spring has an aspect ratio around 8:1 or higher, so buckling is inevitable. This spring must be guided laterally which can cause significant sliding friction between the spring and the pogo stick plunger.

Yet another disadvantage of the steel compression springs used in conventional pogo sticks is that they have linear force/deflection characteristics. This results in the peak force at maximum compression being nearly twice the average force. The average force is defined by the total work on the spring during compression divided by the stroke length.

Accordingly, there is a need for a pogo stick having an efficient energy storage device resulting in the pogo stick providing a large amount of ground clearance while requiring a minimal effort to keep hopping.

There is a further need for a pogo stick having a configuration that precludes the sliding friction inherent in the conventional pogo sticks having steel coil springs.

BRIEF SUMMARY OF THE INVENTION

The present invention provides a locomotion device using a leaf spring as the energy storage device.

The present invention further provides a leaf spring in the form of a high-performance composite spring material such as fiberglass/epoxy or graphite/epoxy that can store at least two times more energy than a conventional steel coil spring having the same weight.

The present invention further provides a leaf spring energy storage device that bends and is pivoted at the top and bottom ends of the pogo stick such that energy losses from sliding friction associated with lateral buckling are substantially eliminated.

Further, the force/deflection characteristics of the present invention may be tailored for the best performance in terms of energy storage and operator comfort such that one embodiment of the present invention with an adult rider exhibits hopping heights of thirty (30) inches or more as measured from the base of the device to the ground, compared to approximately five (5) inches for commercially available pogo sticks.

The present invention further provides a pogo stick that uses rollers to guide the plunger that further improve the overall efficiency and performance of the pogo stick.

The present invention further provides a leaf spring that provides nearly constant force, allowing nearly twice the energy storage of a linear spring having the same plunger stroke and maximum force. In some such embodiments of the present invention, the spring force increases by only 20% from its initial to its fully compressed value thus, giving nearly constant force over the full range.

Other details, objects and advantages of the present invention will become more apparent with the following description of the present invention.

BRIEF DESCRIPTION OF THE SEVERAL VIEWS OF THE DRAWINGS

For the present invention to be understood and readily practiced, the present invention will be described in conjunction with the following Figures wherein:

FIG. 7 is a plot of force vs. deflection for various lateral offsets for the spring shown in FIG. 6; and.

DETAILED DESCRIPTION OF THE INVENTION

The present invention will be described below in terms of a pogo stick. It should be noted that describing the present invention in terms of a pogo stick is for illustrative purposes and the advantages of the present invention may be realized using other structures and technologies that have a need for a locomotion machine with an efficient energy storage device.

It is to be further understood that the Figures and descriptions of the present invention have been simplified to illustrate elements that are relevant for a clear understanding of the present invention, while eliminating, for purposes of clarity, other elements and/or descriptions thereof found in a typical pogo stick. Those of ordinary skill in the art will recognize that other elements may be desirable in order to implement the present invention. However, because such elements are well known in the art, and because they do not facilitate a better understanding of the present invention, a discussion of such elements is not provided herein.

FIGS. 1–4 illustrate a pogo stick 10 of the present invention wherein the spring in the retracted position is shown in broken lines. The pogo stick 10 of the present invention comprises a housing 12, a handle 14, an upper spring pivot 16, a lower spring pivot 18, a lower pivot lug 36, a leaf spring 20, upper guide rollers 22, lower guide rollers 24, a footrest 26, a foot member 28, a foot cushion 35, and a tubular plunger 30. As with a conventional pogo stick, the user stands ,with each foot on the footrest 26, one on each side of the housing 12, holding the handle 14 with both hands. During bouncing, the foot cushion 35 contacts the ground.

Figure 1:
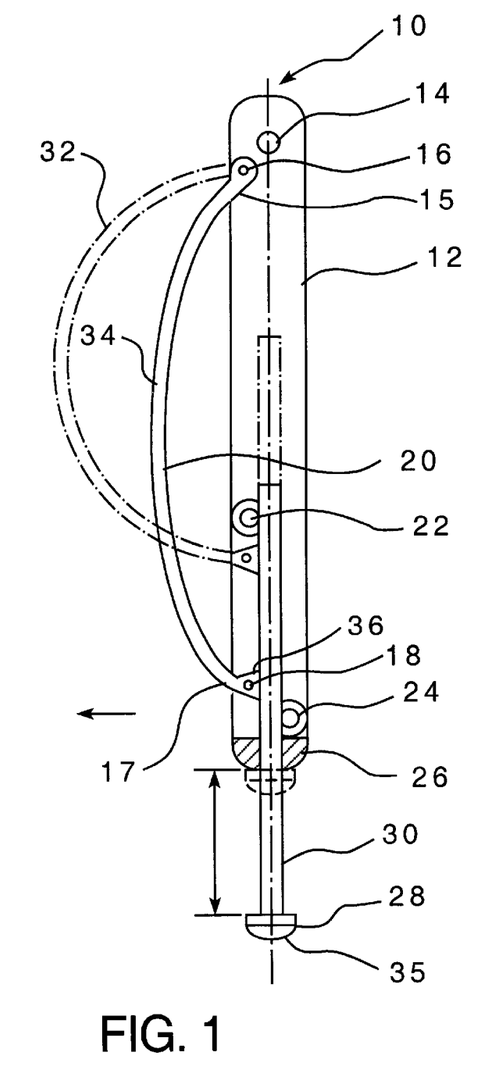
FIG. 1 is a sectional side view of the pogo stick employing the present invention wherein the spring in the retracted position is shown in broken lines.
Figure 2:
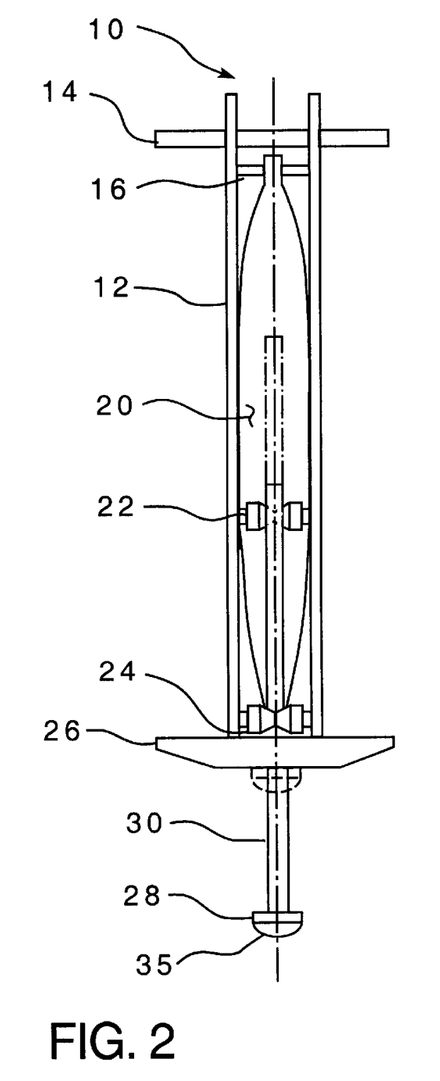
FIG. 2 is a sectional rear view of the pogo stick of the present invention shown in FIG. 1.

The housing 12 may be a substantially three-dimensional rectangular body that may be made from reinforced plastic and be forty (40) inches in height. Alternatively, the housing 12 may be made from wood having aluminum reinforcements at high stress points, or primarily of aluminum, steel, or other well known structural material. The handle 14 is fixedly attached to the top of the housing 12. The handle 14 may be made of steel or aluminum tubing having a one (1) inch diameter, a length of fourteen (14) inches and having bicycle-type handgrips (not shown) mounted thereon. The plunger 30 may be made from steel or aluminum tubing having a 1.25 inch diameter and being thirty-two (32) inches in length. The footrest 26 is fixedly connected to the housing 12. The footrest 26 may be a wood, metal, or reinforced plastic flat plate with a rough traction surface on the top where the user's feet rest.

The upper guide rollers 22 and the lower guide rollers 24 are spaced relative to one another and are each fixedly connected to the interior of the housing 12 using a steel pin that may have a 0.25 inch diameter. The upper guide rollers 22 and the lower guide rollers 24 each may be two acetal plastic, V-shaped rollers having a 1.5 inch diameter and being approximately 1.5 inches in length. The plunger 30 moves vertically in the housing 12, guided by guide rollers 22 and 24.

The leaf spring 20 is shown in a retracted position at 32 and in an extended position at 34. In the present embodiment, the leaf spring 20 may be made from unidirectional fiberglass or graphite strips 0.08 inches thick, 2.5 inches wide, and 36 inches in length. The leaf spring is laminated with epoxy from individual strips each 0.08 inches thick on a curved form to give a constant thickness of 0.48 inches and a moderate curvature of approximately 60 degrees over the 36 inches length of the leaf spring 20. When in the fully retracted position at 32 the leaf spring 20 bends to about 180 degrees, i.e., a half circle. This yields a total deflection of about 10.7 inches. The width of the leaf spring 20 is 2.5 inches at the mid-length, and contoured in sinusoidal shape to zero at the ends of the leaf spring 20, except that the ends are made wide enough to resist the shear stresses. It will be understood that the leaf spring may be fabricated from other materials such as metals, thermoplastics, fiber-reinforced thermoplastics such as fiberglass/nylon, or plastics using graphite, glass or other fiber reinforcing materials.

The proximal end 15 of the leaf spring 20 is pivotably connected at the top of the housing 12 with upper spring pivot 16. The upper spring pivot 16 may be a steel rod having 0.25 inches diameter. The distal end 17 of the leaf spring 20 is pivotably connected by the lower spring pivot 18 to the lower pivot lug 36, which is mounted on the plunger 30 such that the plunger 30 may slide between upper and lower guide rollers 22 and 24. The leaf spring 20 is mounted to the housing 12 such that when the leaf spring 20 is in the retracted position at 32, the leaf spring 20 stores elastic energy in bending deflection. Unlike a long coil spring, the leaf spring 20 does not need guides to prevent buckling, thus precluding the sliding friction inherent in steel coil springs. Friction of the plunger moving in the body is minimized by the upper and lower guide rollers 22 and 24 and the overturning moment of the plunger 30 is resisted.

The stop cushion (not shown) mounts to the bottom of the lower pivot lug 36. When the plunger 30 is fully retracted within the housing 12, the stop cushion contacts the footrest 26, thereby cushioning the impact of the plunger 30 against the housing 12. This minimizes noise and wear associated with the impact.

In operation, a user mounts the pogo stick 10 by placing his feet on the footrest 26 and then bounces on the pogo stick 10 such that the foot 28 and foot cushion 35 is raised off the ground and thereafter strikes the ground. The foot cushion 35 prevents damage to the foot and ground and provides a traction surface to prevent slipping of the foot 28 on the ground. When the foot 28 impacts the floor, the plunger 30 slides within the housing 12 applying force F to bottom end of the leaf spring 20 and thus, the leaf spring 20 moves to the retracted position at 32. In the retracted position at 32 energy is stored by the bending deflection of the spring 20. The user adds energy to the bouncing motion while the foot 28 is in contact with the ground by the user pushing downward with his feet and legs against the footrest 26, and with his hands and arms against the handle 14. By adding energy on each bounce, the user causes the bounce height to increase from one bounce to the next, until the energy storage limit of the spring is reached.

Figure 3:
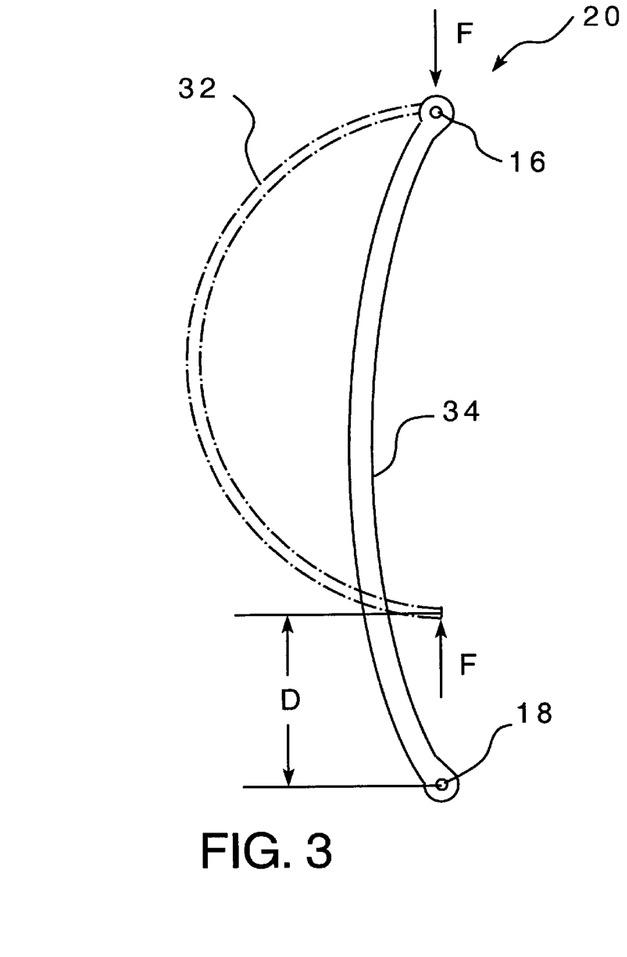
FIG. 3 is a side view of the spring of the pogo stick of the present invention shown in FIG. 1 wherein the spring is shown in the retracted position in broken lines.
Figure 4:
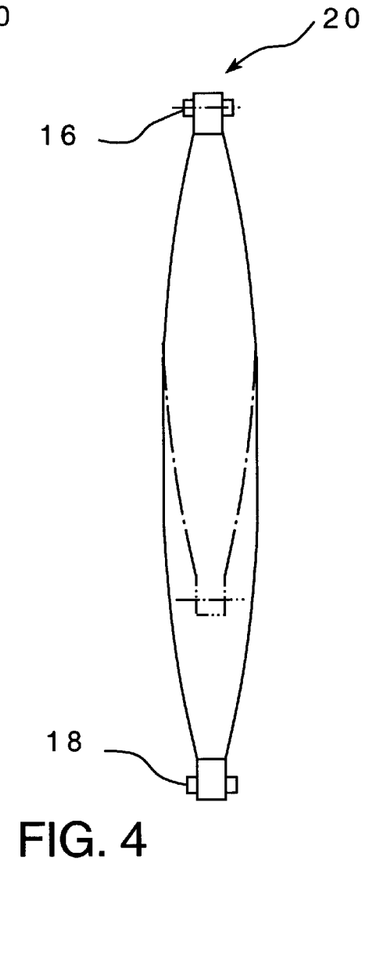
FIG. 4 is a rear view of the spring of the pogo stick of the present invention shown in FIG. 3 wherein the spring is shown in the retracted position in broken lines.
Figure 5:
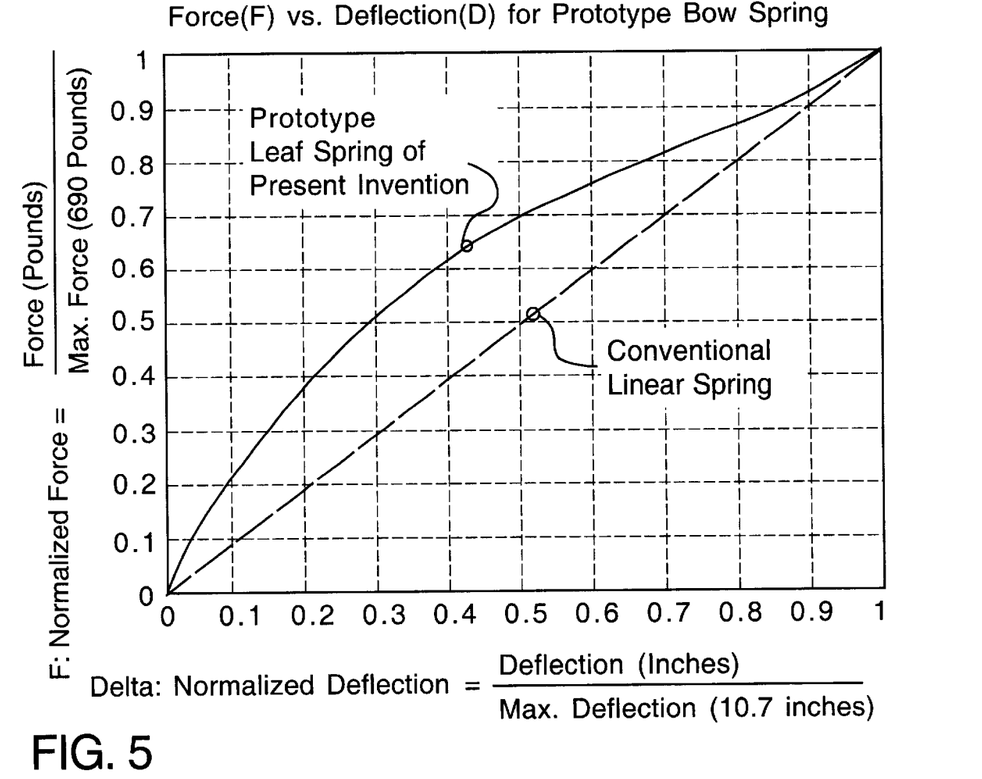
FIG. 5 is a plot of force vs. deflection for the spring shown in FIGS. 3 and 4.

FIG. 5 is a plot of force vs. deflection for the leaf spring 20 shown in FIGS. 3 and 4. The plot has been normalized such that the maximum force and deflection correspond to values of 1.0 on the plot. For one embodiment of the invention, maximum force is 690 pounds and maximum deflection is 10.7 inches. Maximum bending stress in the outer fibers is about 80,000 PSI; maximum shear (at centerline) is about 2000 PSI. The total energy storage is 4700 pound-inches. While the force increases monotonically with deflection, the stiffness or spring rate decreases with deflection. Compared to the conventional linear spring, also shown in FIG. 5, the prototype spring has a higher average force, and thus greater energy storage for the same deflection and peak force.

Figure 6:
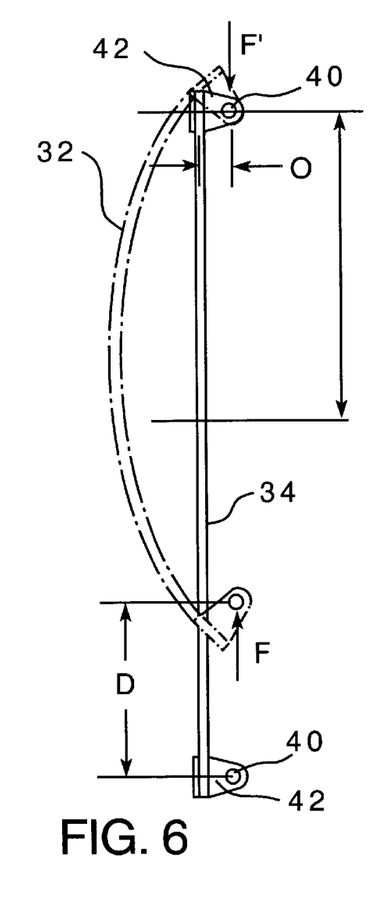
FIG. 6 is a side view of alternative flat spring of the present invention wherein the spring is shown in the retracted position in broken lines.

FIG. 6 is a side view of an alternative flat spring of the present invention wherein the spring is shown in the extended position 34 and the retracted position 32 in broken lines. The stiffness characteristic of the spring 20 of the present invention may be adjusted by various methods. For example, forming the spring 20 such as shown in FIGS. 3 and 4 but without any initial curvature produces a nearly constant force, increasing about 20% from zero to full deflection. Offsetting the pivot points 40 from the spring centerline, as shown in FIG. 6, also affects the spring-rate curve. The flat spring design has a number of advantages including simplicity of fabrication in that the spring 20 can be simply cut from a plate of proper thickness. Also, the monolithic material can sustain higher shear stresses than the bond between laminations, allowing application of higher loads. The difference in shear strength is typically about a 2:1 ratio. The offset lever arms 42 can be easily changed to adjust the spring characteristics, thus accommodating different riders or operating conditions.

Figure 7:
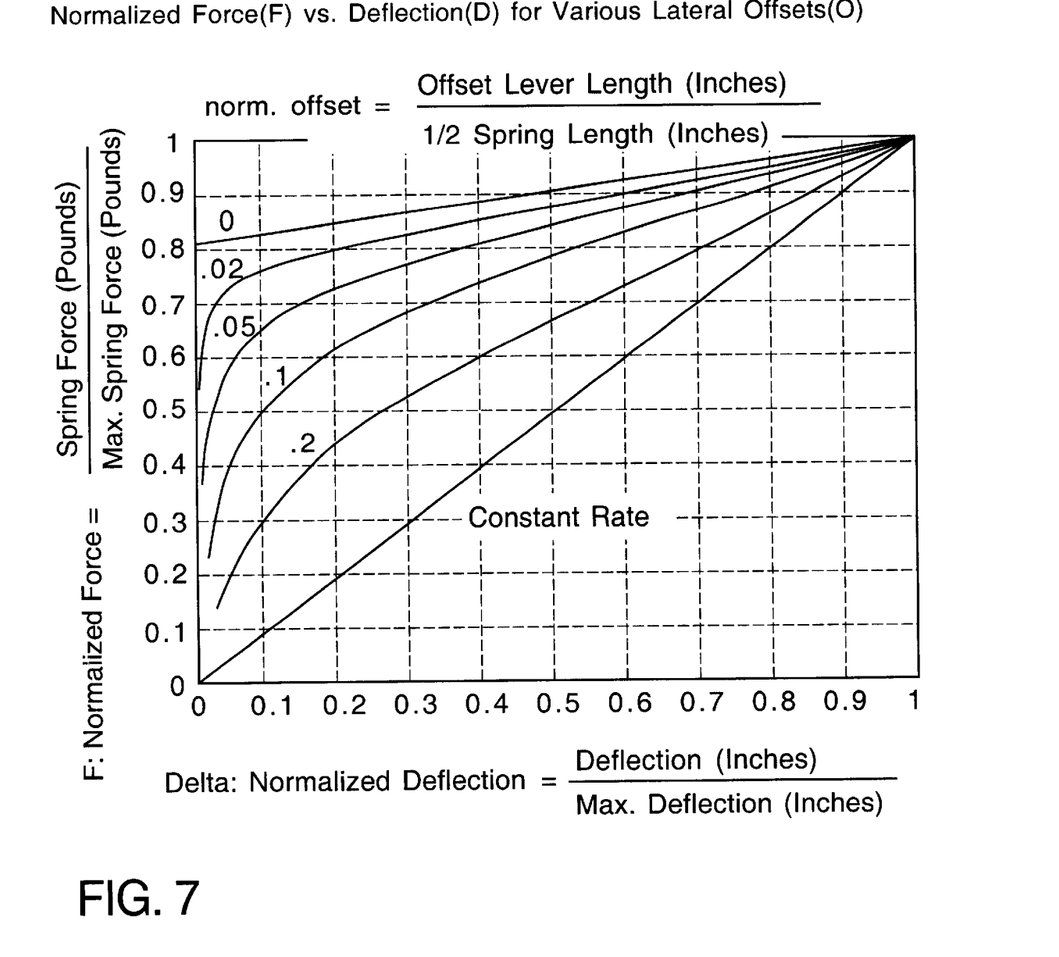

FIG. 7 is a plot of force vs. deflection for various lateral offsets for the spring shown in FIG. 6. With zero offset (top curve FIG. 7) the force is nearly constant over the total deflection range, increasing by about 20%. While a constant-force spring yields the greatest energy storage for a given deflection D and peak force, experiments show that the shock due to this sudden change of force on impact is uncomfortable for the rider and may be detrimental to control and efficiency. The ideal would seem to be a curve that rises rapidly to maximum, then flattens-out for most of the deflection range such as the curve with normalized offset of 0.1. Recent experiments have shown that a normalized offset (the offset lever length divided by half the spring length) around 0.2 provides a good compromise between comfort/efficiency and energy storage.

While the figure shows the pivots offset at both ends, similar effect can be had by using the offset at one end only; however, a greater offset is needed for comparable effect. The particular offset(s) used affects the spring profile (e.g., width variation) needed for optimal energy storage. Using springs with constant width simplifies manufacturing and precludes splintering.

Figure 8:
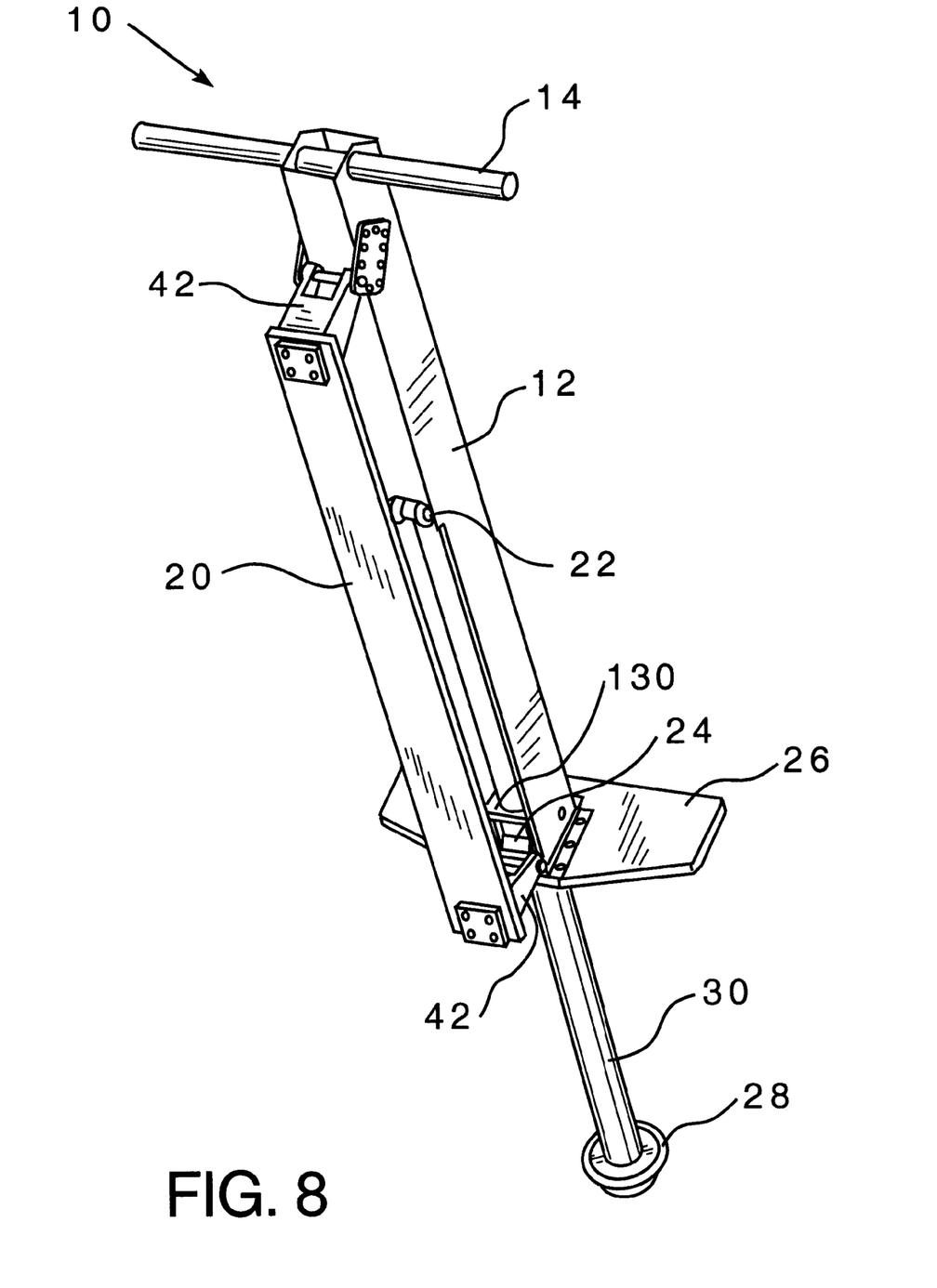
FIG. 8 is a perspective view of another embodiment of a pogo stick employing a flat spring of the present invention and wherein the pogo stick has an offset lever and is shown in the extended position.
Figure 9:
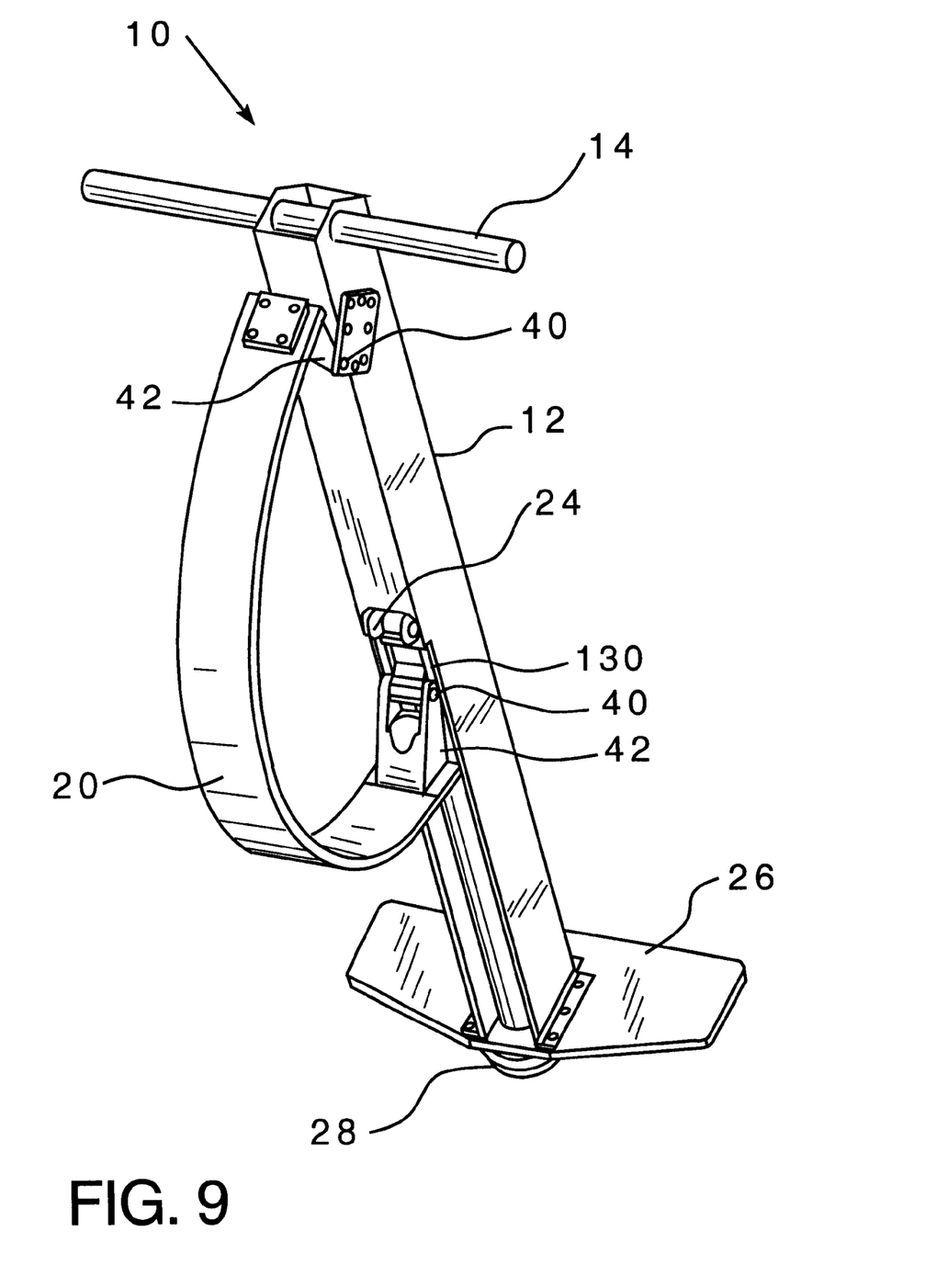
FIG. 9 is a perspective view of the pogo stick of the present invention shown in FIG. 8 wherein the pogo stick is shown in the retracted position.

FIGS. 8 and 9 are perspective views of another embodiment of the pogo stick 10 of the present invention wherein the pogo stick 10 has offset levers 42 and a flat, untapered spring 20 and a plate 130 for preventing rotation of the plunger positioned within the housing 12 through which plunger 30 slides. The plunger 30 and spring 20 extended in FIG. 8 retracted in FIG. 9. This embodiment is similar to the embodiment illustrated in FIGS. 1–4 except that this pogo stick 10 has a flat spring 20 and employs offset levers 42. The spring 20 has a constant cross-section of 2.5 inches wide and 0.364 inches thick, and is 30.7 inches in length. The spring 20 is a monolithic piece of unidirectional fiberglass reinforced epoxy as used in the archery limb industry. The plunger stroke is 15 inches. The total height of pogo stick 10 is approximately 55 inches. The pivet 40 is offset 2.8 inches from the centerline of the spring 20, providing a gradually increasing force profile. Hopping heights of about 24 inches have been measured with a 130 pound rider. We have used it to hop up and down steps, made long jumps over 6 feet, and covered 50 feet of lateral distance in 10 hops. This embodiment weighs approximately 10 pounds. The lighter weight makes this unit easier to control and less tiring to operate.

The pogo stick of the present invention shown in FIG. 8 and 9 was fitted with a wider tapered spring. The spring was 0.364 inches thick, 3.05 inches wide at the middle, 2.0 inches wide at the ends, and 30.7 inches long. With this spring a 130 pound rider achieved hopping heights over 40 inches.

Figure 10:
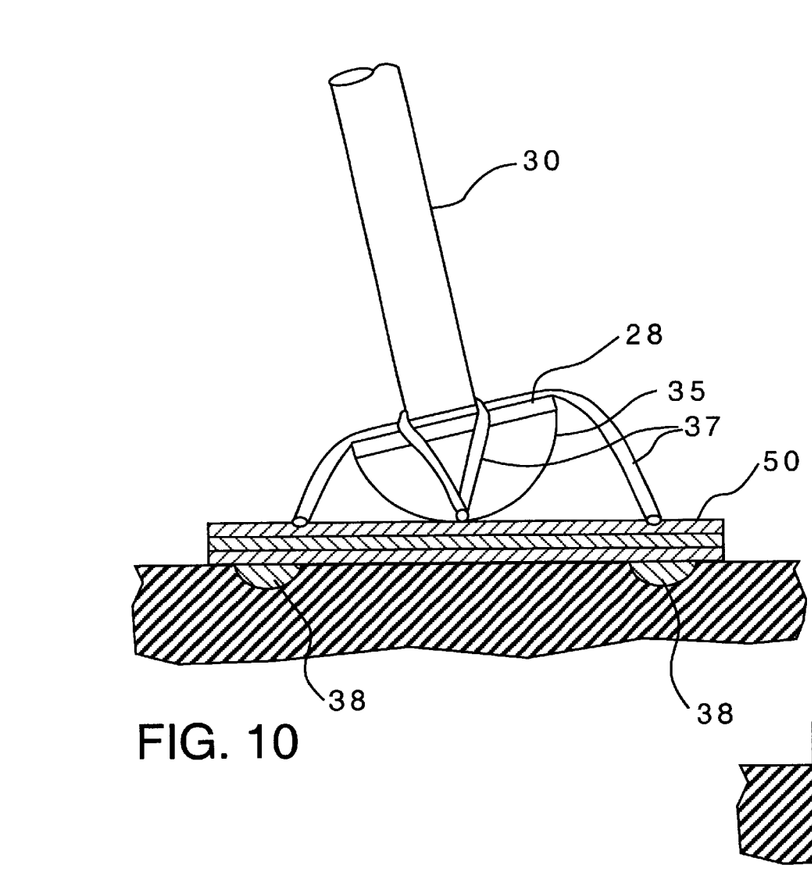
FIG. 10 is a side view of another embodiment of the present invention wherein a flat foot is pivotably attached to the foot of the pogo stick.
Figure 11:
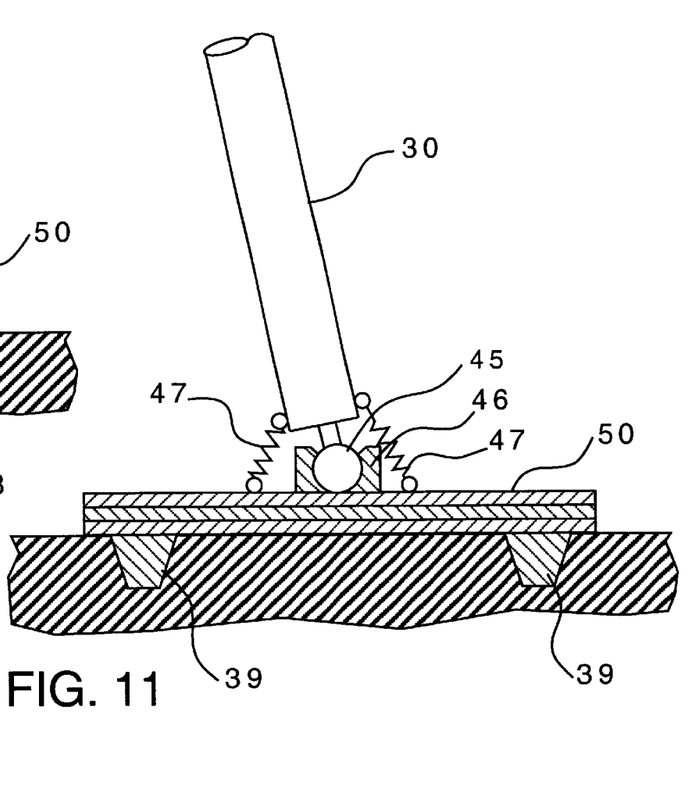
FIG. 11 is a cross-sectional view showing an alternative design of a flat foot for the present invention using a ball-and-socket joint.

FIG. 10 is a side view of another embodiment of the present invention wherein a flat foot is pivotably attached to the foot of the pogo stick and FIG. 11 is a cross-sectional view showing an alternative design of a flat foot for the present invention using a ball-and-socket joint. The rounded rubber foot cushion 35, approximately 3 inches in diameter on present prototypes, provides good impact absorption and traction on paved and other hard surfaces. Alternatively, the present invention may have a large substantially flat foot that pivots to accommodate ground contact. FIGS. 10 and 11 illustrate two embodiments of the present invention having a substantially flat foot. In FIG. 10, a flat foot plate 50 is attached to the bottom of the foot 28 and foot cushion 35 with elastic bands 37. The foot plate 50 can roll against the foot cushion 35 to align to the ground surface, and allow the plunger 30 and pogo stick 10 to rotate about the contact point. This embodiment has a five (5) inch diameter disk of 0.75 inch plywood as the foot plate 50 and was found to function well on grass, gravel, and sand, and reduces the tendency of the foot to sink into the ground.

An alternate design shown in FIG. 11 uses a ball pivot 45 that attaches to the end of the plunger 30 and rests in a socket 46. Springs or elastic bands 47 are used to keep the foot plate 50 nominally perpendicular to the plunger 30 while allowing the foot plate 50 to align itself with the ground surface. The springs 47 may also hold the ball 45 and socket 46 together. Small rubber feet 38 shown in FIG. 10 may be used to increase traction on smooth surfaces. Cleats 39 shown in FIG. 11 may be used to increase traction on soft surfaces.

Maximum hopping height depends both on the amount of energy put into the spring and the ability of the user to maintain an upright posture. Spring energy is limited by the maximum compression force the user can exert on the spring. But energy is also proportional to the plunger stroke length so energy and hopping height greater than demonstrated in the present embodiment are likely possible. The maximum stroke length may be limited mainly by the available space and geometry of the device. Experiments have shown that control of upright attitude is increasingly difficult with higher hopping heights and flight times, but training may allow heights much greater than the 40 inches achieved thus far.

Another embodiment of the present invention comprises a device similar to the pogo stick used as a leg on a single or multi-legged robot, toy or other locomotion device by attaching the housing of the pogo stick to a hip joint on such a machine. Another embodiment of the present invention may use two of the pogo sticks of the present invention, one for each leg of the user connected to the user's leg or body, thus allowing a running motion with springy legs. Similarly, a single pogo stick device could be fitted with a pivot at the top to allow the device to swing fore/aft and/or laterally to accommodate rapid fore/aft or sideways motion.

The present invention may be used in devices for recreation, exercise, sport and transportation. Lightweight and efficient designs of the present invention enhance control, permit stepping around, over and onto obstacles.

Those of ordinary skill in the art will recognize, however, that many modifications and variations of the present invention may be implemented without departing from the spirit and scope of the present invention. The foregoing description and the following claims are intended to cover such modifications and variations.

What we claim is:

1. A pogo stick, comprising:
   a housing having a handle, a first end portion and a second end portion;
   a plunger being slideably connected to said housing second end portion; and
   a leaf spring pivotally connected to said housing first end portion, said leaf spring also pivotally attached to said plunger.

2. The pogo stick of claim 1 wherein said leaf spring is made of one of fiber-reinforced thermosetting plastic and fiber-reinforced thermoplastic.

3. The pogo stick of claim 2 wherein the leaf spring is made of fiberglass/epoxy.

4. The pogo stick of claim 2 wherein the leaf spring is made of graphite/epoxy.

5. The pogo stick of claim 2 wherein the leaf spring is made of fiberglass/nylon.

6. The pogo stick of claim 1 wherein said leaf spring has a substantially constant thickness along the length thereof.

7. The pogo stick of claim 1 wherein the width of said leaf spring is sized and proportioned to provide constant bending stresses along the length thereof and the ends of said leaf spring are sized and proportioned to withstand shear stresses.

8. The logo stick of claim 1 wherein said leaf spring is fabricated from a single piece of material.

9. The pogo stick of claim 1 wherein said leaf spring is a flat piece of material having a substantially constant cross-section.

10. A pogo stick, comprising:
    a housing having a handle, a first end portion and a second end portion;
    a plunger being slideably connected to said housing second end portion;
    a leaf spring pivotally connected to said housing first end portion, said leaf spring also pivotally attached to said plunger; and
    two offset levers, each having a first and a second end, one of said offset levers being pivotally attached to said housing and the other of said levers being pivotally attached to said plunger and each of said levers being fixedly attached to said leaf spring.

11. A pogo stick, comprising:
    a housing having a handle, a first end portion and a second end portion;
    a plunger being slideably connected to said housing second end portion;
    a leaf spring pivotally connected to said housing first end portion, said leaf spring also pivotally attached to said plunger; and,
    a plurality of rollers connected to said housing wherein each roller of said plurality of roller is spaced relative to another said roller.

12. The pogo stick of claim 11 wherein said guide rollers are made from plastic material.

13. The pogo stick of claim 1 wherein said housing defines a pathway in which said plunger slides.

14. The pogo stick of claim 11 wherein each of said plurality of rollers are V-shaped.

15. The pogo stick of claim 1 further comprising a handle fixedly connected to said housing first end portion.

16. A pogo stick, comprising:
    a housing having a handle, a first end portion and a second end portion;
    a plunger being slideably connected to said housing second end portion;
    a leaf spring pivotally connected to said housing first end portion, said leaf spring also pivotally attached to said plunger; and,
    a foot member fixedly attached to said plunger.

17. A pogo stick, comprising:
    a housing having a handle, a first end portion and a second end portion;
    a plunger being slideably connected to said housing second end portion;
    a leaf spring pivotally connected to said housing first end portion, said leaf spring also pivotally attached to said plunger; and,
    a foot member pivotally attached to said plunger.

18. The pogo stick of claim 17 wherein said foot member is pivotally attached to said plunger using a ball and socket joint.

19. The pogo stick of claim 16 wherein said foot member has an anti-friction surface.

20. The pogo stick of claim 17 wherein said foot member has cleats.

21. A device comprising:
    a housing having a handle, a first end portion, a second end portion and defining a pathway along a portion of the length thereof;
    a plunger slideably connected within said housing pathway; and
    a leaf spring having a proximal end and a distal end, said proximal end being pivotally attached to said housing first end portion and said distal end being pivotally attached to said plunger.

22. The device according to claim 21, wherein said device is used for transportation.

23. The device according to claim 21, wherein said device is used for exercise.

24. The device according to claim 21, wherein said device is used for recreation.

25. A method for locomoting, comprising:
    providing a locomotion device having a housing having a handle and defining a pathway, a plunger slideably attached to the housing for movement along said pathway and a single leaf means pivotally connected at one end to said plunger and pivotally connected at the other end to said housing;
    sliding the plunger along the housing pathway;
    compressing the leaf spring to a retracted position such that energy is stored with the spring; and
    releasing the leaf spring such that it moves to an extended position such that the energy stored with the spring is released to effect movement of the locomotion device.

26. A pogo stick comprising:
    a housing having a handle, a first end portion and a second end portion;
    a plunger slideably mounted within the second end portion of said housing;
    a spring means connecting said housing and said plunger for storing elastic energy for release when the spring means is compressed in the plunger;
    a plurality of guide rollers connected to said housing defining a pathway in which said plunger slides for reducing sliding friction between the plunger and said housing.

27. A device comprising:
a housing having a handle, a first end portion and a second end portion;
a plunger being slideably connected to said housing second end portion; and
a single leaf spring pivotally connected to said housing first end portion, said leaf spring also pivotally attached to said plunger.

28. A device comprising:
a housing having a handle, a first end portion, a second end portion and defining a pathway along a portion of the length thereof;
a plunger slideably connected within said housing pathway; and
a single leaf spring having a proximal end and a distal end, said proximal end being pivotally attached to said housing first end portion and said distal end being pivotally attached to said plunger.

29. The pogo stick of claim 13 further comprising an anti-rotation member within said housing through which said plunger slides to prevent rotation of said plunger.

30. The pogo stick of claim 16 wherein said foot member is positioned on the distal end of the plunger.

31. The pogo stick of claim 17 wherein said foot member is positioned on the distal end of the plunger.

32. A device comprising:
a housing having a handle, a first end portion and a second end portion;
a plunger connected to said housing second end portion for sliding engagement therewith;
means pivotally connected to said housing and to said plunger for storing elastic energy upon compression thereof when said plunger is deflected towards the first end portion of said housing, said energy storing means structured such that it has a force-deflection characteristic wherein its stiffness decreases with deflection of said plunger towards the first end portion of said housing and whereby the energy storage is maximized for a given deflection and peak force applied to said plunger.

33. The device of claim 32 wherein said energy storage means is a single leaf spring.

34. The device of claim 32 further comprising means for offsetting said energy storage means from said housing and said plunger.

35. The device of claim 34 wherein said offsetting means comprises two levers, each said lever having a first and a second end, one said lever being pivotally attached at said first end to said housing and fixedly attached at said second end to said energy storage means, and the other said lever being pivotally attached at said first end to said plunger and fixedly attached at said second end to said energy storage means.

36. The device of claim 32 further comprising a plurality of guide rollers connected to said housing defining a pathway in which said plunger slides for reducing sliding friction between the plunger and said housing.

37. The device of claim 21 wherein said device forms a leg of a robot having at least one leg.

38. The device of claim 21 wherein said device forms a leg of a toy having at least one leg.

39. A device comprising:
two housings, each having a first end portion, a second end portion and defining a pathway along a portion of the length thereof;
a handle connected to at least one of said housings;
two plungers, each plunger being slideably connected within said housing pathway of a different one of said two housings; and
two leaf springs, each having a proximal end and a distal end, said proximal end of each leaf spring being pivotally attached to the first end portion of a different one of said two housings and said distal end of each leaf spring being pivotally attached to a different one of said plungers.

40. The device of claim 39 wherein each housing of said device is used for attachment to a users' legs for locomotion.

41. The pogo stick of claim 16 wherein said foot member has traction enhancing surface.

42. A locomotion device comprising:
a housing having a handle, a first end portion and a second end portion;
a plunger being slideably connected to said housing second end portion; and
a leaf spring pivotally connected to said housing first end portion, said leaf spring also pivotally attached to said plunger.

43. The locomotion device of claim 42 further comprising a plurality of rollers connected to said housing wherein said plurality of rollers are spaced relative to one another for sliding contact with said plunger.

44. The locomotion device of claim 42 further comprising two offset levers, each having a first and a second end, one of said offset levers being pivotally attached to said housing and the other of said levers being pivotally attached to said plunger and each of said levers being fixedly attached to said leaf spring.

45. The locomotion device of claim 42 wherein said device further comprises a pivot member positioned at the first end of the housing for attachment to a surface to allow pivotal movement of said device relative to said surface.

* * * * *

UNITED STATES PATENT AND TRADEMARK OFFICE
CERTIFICATE OF CORRECTION

PATENT NO.   : 6,558,297 B1
DATED        : May 6, 2003
INVENTOR(S)  : H. Benjamin Brown, Jr., Illah R. Nourbakhsh and Garth John Zeglin It is certified that error appears in the above-identified patent and that said Letters Patent is hereby corrected as shown below:

<u>Column 1,</u>
Line 30, remove the period after "weight"

<u>Column 3,</u>
Line 34, remove the comma between "stands ,with"

<u>Column 5,</u>
Line 30, remove the hyphen between "flattens-out"
Line 57, remove "pivet" and replace with -- pivot --

<u>Column 7,</u>
Line 26, remove "logo" and replace with -- pogo --

Signed and Sealed this

Thirtieth Day of December, 2003

JAMES E. ROGAN
*Director of the United States Patent and Trademark Office*